July 17, 1956  J. ARNOLD  2,755,370
CAMERA HEATER
Filed Nov. 17, 1952

JOHN ARNOLD
INVENTOR.

BY Lyon & Lyon
ATTORNEYS

United States Patent Office 2,755,370
Patented July 17, 1956

2,755,370

CAMERA HEATER

John Arnold, Los Angeles, Calif., assignor to Loew's Incorporated, Culver City, Calif., a corporation of Delaware Application November 17, 1952, Serial No. 320,901

3 Claims. (Cl. 219—19)

This invention relates to photographic equipment and is particularly directed to apparatus for heating the bearings for high speed shafts in motion picture cameras.

Cameras of the type used commercially in making motion pictures are precision instruments and the moving parts thereof are constructed with close running fits for optimum performance and to eliminate noise. Commercial motion picture cameras operate satisfactorily in warm weather but are known to give trouble when taken on location during the winter months or when used at night when temperatures are low. The low temperatures increase the viscosity of the lubricants employed and furthermore reduce necessary clearances through the action of unequal thermal contraction of the various parts. The main housing for the high speed shafts of the camera may be constructed of aluminum in order to reduce weight, whereas the shafts are made of steel. Consequently at low temperatures the running clearances are reduced.

Previously attempts have been made to avoid low temperature difficulties by heating the entire camera. This was accomplished by enclosing the major portion of the camera within an insulating housing or by wrapping insulating material around the outside of the camera. The principal difficulty that arises with this attempted solution of the problem is that the camera lens system is subjected to fogging. The fogging of the lens system may not be noticed until after the day's run has been processed in the laboratory. Any appreciable fogging, of course, ruins the film.

In accordance with my invention, I provide localized heating for the particular parts of the camera mechanism which tend to slow down in cool weather and position localized heating devices within the camera enclosure remote from the lens system so that the lens is substantially unaffected by the heating devices and fogging is thereby eliminated.

It is therefore the principal object of my invention to provide a new and improved heating device for a motion picture camera, which device does not adversely affect the performance of the camera lens system.

A related object is to provide adjustable thermostatic control means for automatically regulating the amount of heat supplied locally to the shaft supporting parts of the camera housing.

Another object is to provide a heating device for a motion picture camera, which heating device may be electrically operated from a conventional six volt automobile battery.

Another object is to provide a heater device of this type which is easily installed and which remains permanently on the camera and which may be readily connected to a source of electrical energy through a plug or socket mounted exteriorly of the camera housing.

Other related objects and advantages will appear hereinafter.

Referring to the drawing.

Figure 1:
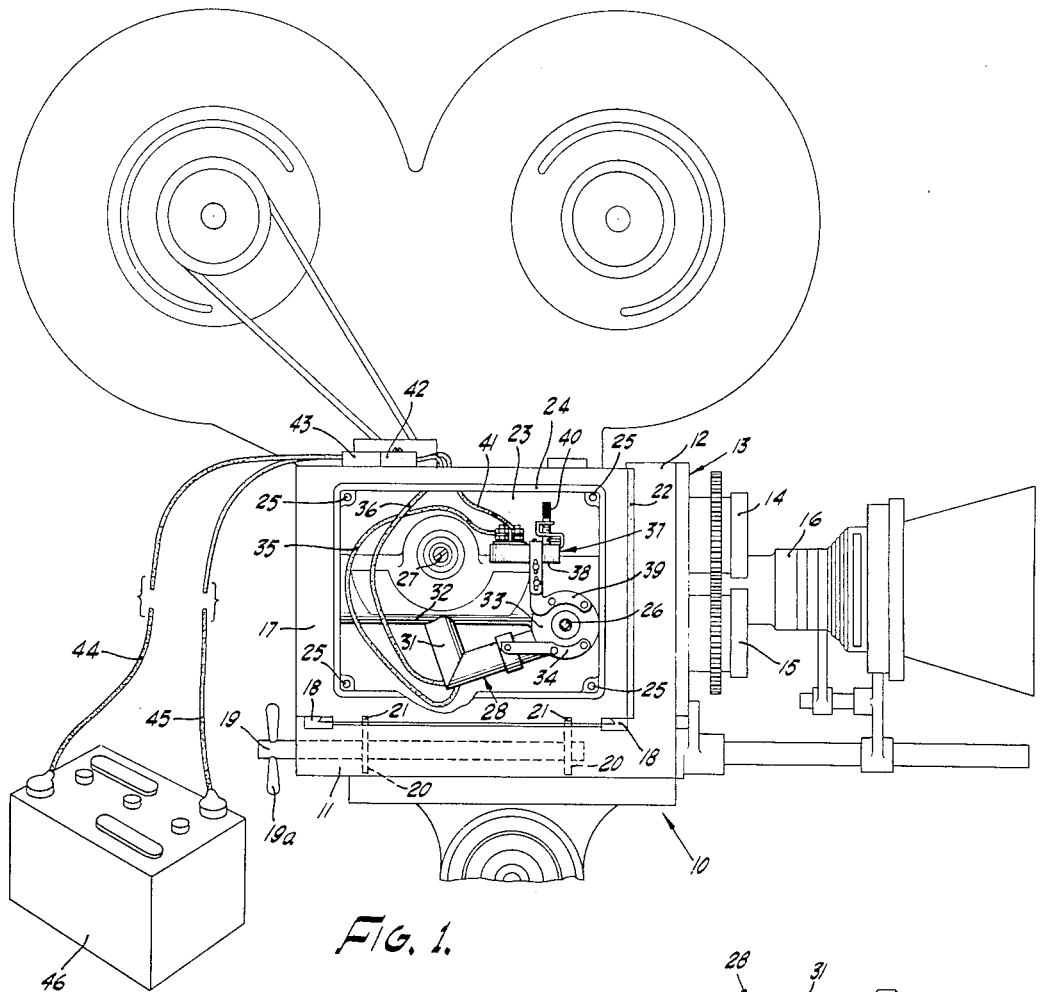
Figure 1 shows a side elevation of a motion picture camera embodying my invention.
Figure 3:
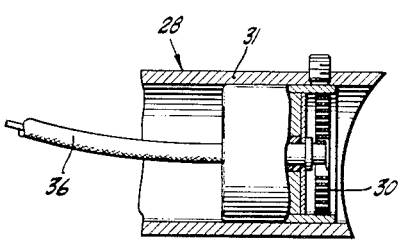
Figure 3 is a fragmentary sectional view taken substantially on the lines 3—3 as shown in Figure 2.
Figure 2:
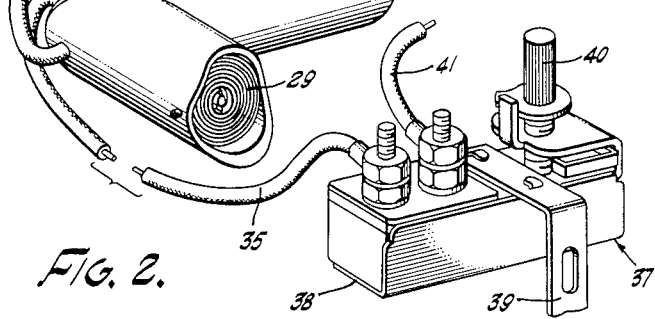
Figure 2 is a perspective view showing the adjustable thermostatic control switch and also showing the heater assembly.

Referring to the drawing, the motion picture camera generally designated 10 is provided with a horizontal base 11 having an integral upstanding flange 12 at its forward end. A turret head generally designated 13 includes a plurality of lenses 14, 15 and 16. Any one of these lenses may be brought into operative position, as will be readily understood. A housing or frame 17 is carried on ways 18 for lateral sliding movement relative to the base 11. A shaft 19 is rotatably mounted on the base and carries spaced gears 20 which engage racks 21 on the housing 17. A handle 19a on the shaft may be turned manually by an operator to shift the housing 17 laterally with respect to the base 11 and flange 12. Felt curtains 22, or other suitable light sealing means, prevent entrance of light between the housing 17 and the flange 12.

It will be understood that the housing 17 contains a compartment, not shown, in which the usual film drive mechanism and sprockets are located. This compartment is isolated from the space 23 shown in Figure 1 of the drawing. A cover plate, not shown, normally fits over the opening defined within the rectangular flange 24 and is secured in place by means of the threaded apertures 25. A driving motor, not shown, may be mounted on such cover plate and provided with drive means to engage the squared end of the drive shaft 26. This high speed shaft 26 is supported in bearings, not shown, mounted within the housing 17. A second shaft 27 is also rotatably mounted on the housing 17 in parallel relationship with the shaft 26. Drive means, not shown, are provided within the housing 17 for driving the shaft 27 from the shaft 26.

In accordance with my invention, I provide a heater assembly, generally designated 28, which is of relatively small size and which is received within the space 23. This heater assembly 28 employs a pair of duplicate electric resistance heating elements 29 and 30 connected in series. The elements 29 and 30 are preferably mounted in a unitary carrier 31 and the shape of this carrier is dictated by the design of the camera mechanism and by the clearance space available for its installation. The heater unit 29 is placed closely adjacent to a first portion 32 of the casting which comprises the housing 17. The portion 32 of the housing is adjacent one of the bearings for supporting the shaft 27. Similarly the heating element 30 is placed closely adjacent a portion of the boss 33 which forms a part of the casting comprising the housing 17. The boss 33 provides a bearing for the high speed shaft 26. A bracket 34 of any convenient shape may be provided for mounting the assembly 28 on the housing 17. When electrical energy is supplied through the lead wires 35 and 36, the heating elements 29 and 30 radiate heat against the housing portions 32 and 33. The heating elements 29 and 30 may be of the same general type employed in cigarette lighters found on automobile dashboards.

An adjustable thermostatic switch unit generally designated 37 is mounted on the housing 17 within the space 23 at a location remote from the heating elements 29 and 30. The bottom surface 38 of the thermostatic unit 37 rests on a portion of the housing 17 and the unit 37 is maintained in this position by means of a bracket 39, of any suitable type, fixed on the housing 17. The thermostatic unit 37 may be of any conventional type which is commercially available and includes an adjusting knob 40 which regulates the cutoff temperature of the switch unit. When the bottom plate 38 reaches a predetermined temperature, as controlled by the setting of the control knob 40, switch contact elements, not shown, within the unit 37 separate to interrupt the electrical connection between the lead wires 35 and 41, thus interrupting the supply of electrical energy to the heater assembly 28. The heating elements 39 and 30 consequently cool off and the temperature of the housing 17 in the vicinity of the shafts 26 and 27 thereupon falls. When the temperature of the bottom plate 38 falls to a predetermined value, the switch contacts again close to complete the circuit through the leads 35 and 41. The thermostatic switch device 37 is preferably built with a relatively small temperature differential between opening and closing of the switch contacts. The result is that a sensitive control is achieved and, although the heating elements 29 and 30 are turned on and off at intervals by the switch unit 37, the effect is to maintain the desired temperature for the housing portions 32 and 33 within satisfactory operating limits.

The lead wires 36 and 41 pass through an aperture in the wall of the housing 17 and are connected to a terminal block 42 mounted on the housing exteriorly thereof. A connecting plug 43 is connected by lead wires 44 and 45 to the terminals of a conventional six bolt storage battery 46. The plug 43 may be readily disconnected from the terminal block 42 so that the camera 10 and storage battery 46 may be separately transported.

From the above description, it will be understood that electrical energy passing from the battery 46 through lead 44 passes through plug 43 and terminal block 42 and to the thermostatic switch unit 37 via lead wire 41. After the contacts within the switch unit 37 are closed, the electrical energy passes through lead wire 35 to the electric resistance heating elements 29 and 30. The electric circuit is completed through lead wire 36, terminal block 42, plug 43 and lead wire 45, back to the battery 46.

Since the heat of elements 29 and 30 is applied locally to spaced locations on the housing 17 near the bearings for the shafts 26 and 27, only enough heat is required to maintain the shafts and bearings at the desired operating temperature and the remainder of the camera parts receive very little, if any, heat. Since the housing 17 is substantially isolated from the flange 12 by means of the ways 18 and space containing the light seal 22, very little, if any, heat is transmitted to the camera lenses 14, 15 and 16. Fogging of the lenses is thereby avoided.

Having fully described my invention, it is to be understood that I do not wish to be limited to the details herein set forth but my invention is of the full scope of the appended claims.

I claim:

1. In a heater device for a motion picture camera having an upright lens-carrying flange mounted on a horizontal base and having a housing shiftable laterally with respect to the flange and base and provided with a bearing for rotatably mounting a shaft on the housing, the improvement comprising: a heating device mounted on the housing to radiate heat against a localized part of the housing adjacent said shaft bearing, said device having an electrical resistance heating element of relatively small size as compared to the housing and placed immediately adjacent said localized part thereof, a thermostatic switch unit mounted on the housing at a location remote from said heating device, and electrical leads connecting the thermostatic switch unit in series with the heating device.

2. In a heater device for a motion picture camera having an upright lens-carrying flange mounted on a horizontal base and having a housing shiftable laterally with respect to the flange and base and provided with bearings for rotatably mounting shafts on the housing, the improvement comprising: heating devices mounted on the housing to radiate heat against parts of the housing adjacent said shaft bearings, said devices each having an electrical resistance heating element of relatively small size as compared to the housing and each being placed immediately adjacent one of said parts of the housing for localized heating, means shielding each of said elements to confine the heat radiation therefrom directly against said localized part, a thermostatic switch unit mounted on the housing at a location remote from said heating devices, and electrical leads connecting the thermostatic switch unit in series with the heating devices.

3. In a heater device for a motion picture camera having an upright lens-carrying flange mounted on a horizontal base and having a housing shiftable laterally with respect to the flange and base and provided with a shaft bearing, the improvement comprising: a heating device mounted on the housing to radiate heat against a localized part of the housing adjacent said shaft bearing, said device having an electrical resistance heating element of relatively small size compared to the housing and placed immediately adjacent said localized part thereof, a thermostatic switch unit mounted on the housing at a location remote from said heating device, a terminal block mounted on the housing externally thereof, and electrical leads connecting the switch unit, heating device and terminal block in series.

References Cited in the file of this patent

UNITED STATES PATENTS

| | | |
|---|---|---|
| 1,056,507 | Cronjager | Mar. 18, 1913 |
| 2,345,365 | Steiner | Mar. 28, 1944 |
| 2,353,898 | Nitsch | July 18, 1944 |
| 2,404,736 | Marick | July 23, 1946 |
| 2,429,051 | Doyle | Oct. 14, 1947 |
| 2,442,913 | Abrams et al. | June 8, 1948 |
| 2,572,475 | Hanson | Oct. 23, 1951 |
| 2,594,178 | Karr | Apr. 22, 1952 |
| 2,596,222 | Doyle et al. | May 13, 1952 |

FOREIGN PATENTS

| | | |
|---|---|---|
| 511,700 | Germany | Nov. 1, 1930 |